United States Patent [19]

Dorman

[11] Patent Number: 5,389,054
[45] Date of Patent: Feb. 14, 1995

[54] EDUCATIONAL BALANCE BEAM

[76] Inventor: Mark R. Dorman, P.O. Box 335, Clayton, N.Y. 13624

[21] Appl. No.: 142,618

[22] Filed: Oct. 25, 1993

[51] Int. Cl.⁶ ............................................. A63B 1/00
[52] U.S. Cl. .................................................... 482/34
[58] Field of Search ................. 482/34; 434/247, 250, 434/255, 258, 259; 446/396

[56] References Cited

U.S. PATENT DOCUMENTS

| | | | |
|---|---|---|---|
| D. 308,698 | 6/1990 | Dorman | 482/34 X |
| 3,837,644 | 9/1974 | Stinchcomb | 482/34 X |
| 3,944,654 | 3/1976 | Moore | 482/34 |
| 4,105,201 | 8/1978 | L'Ecuyer et al. | 482/34 |

Primary Examiner—Stephen R. Crow
Assistant Examiner—Glenn E. Richman
Attorney, Agent, or Firm—Howard J. Greenwald

[57] ABSTRACT

An educational talking balance beam comprised of a beam, a first notched support base, and a second notched support base. The beam contains a first wall, a second wall, and a third wall; and a multiplicity of symbols (such as numbers, letters, shapes, colors, and mixtures thereof) appear on the first exterior surface of the first wall. The device contains an apparatus for announcing the name of such symbol whenever pressure is applied to the exterior surface of the beam at a point where the symbol appears thereon.

11 Claims, 2 Drawing Sheets

EDUCATIONAL BALANCE BEAM

FIELD OF THE INVENTION

A toy balance beam structure for walking at near ground level or floor level.

BACKGROUND OF THE INVENTION

Balancing toys on which a child may walk are well known. Thus, for example, U.S. Pat. No. 3,837,644 of Stinchcomb discloses a walk-on type of horizontal rail with cross-ties and a platform at one end of such rail having a foot switch-controlled timing mechanism. A similar balancing toy is also disclosed in Mark Dorman's U.S. Des. Pat. No. D308,698. The entire disclosure of each of these United States patents is hereby incorporated by reference into this specification.

There is a substantial body of research indicating that when a visual image is reinforced by auditory input, the learning process is enhanced. It would be desirable to have an educational balance beam toy which, when a child steps upon a specified symbol (such as a shape, color, number, or letter), the toy will speak the name of such indicia to the child. To the best of applicant's knowledge, no such device has been provided or suggested by the prior art.

It is an object of this invention to provide an educational balance beam toy which, when a child steps upon a specified symbol (such as a shape, color, number, or letter), the toy will speak the name of such indicia to the child.

SUMMARY OF THE INVENTION

In accordance with this invention, there is provided an educational balance beam system which is comprised of a beam with various indicia or colors on at least one of the surfaces of such beam and two notched support bars adapted to support such beam. The beam contains electronic circuitry adapted to speak the name of a symbol when pressure is applied to the beam at that portion of the beam where the symbol appears.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
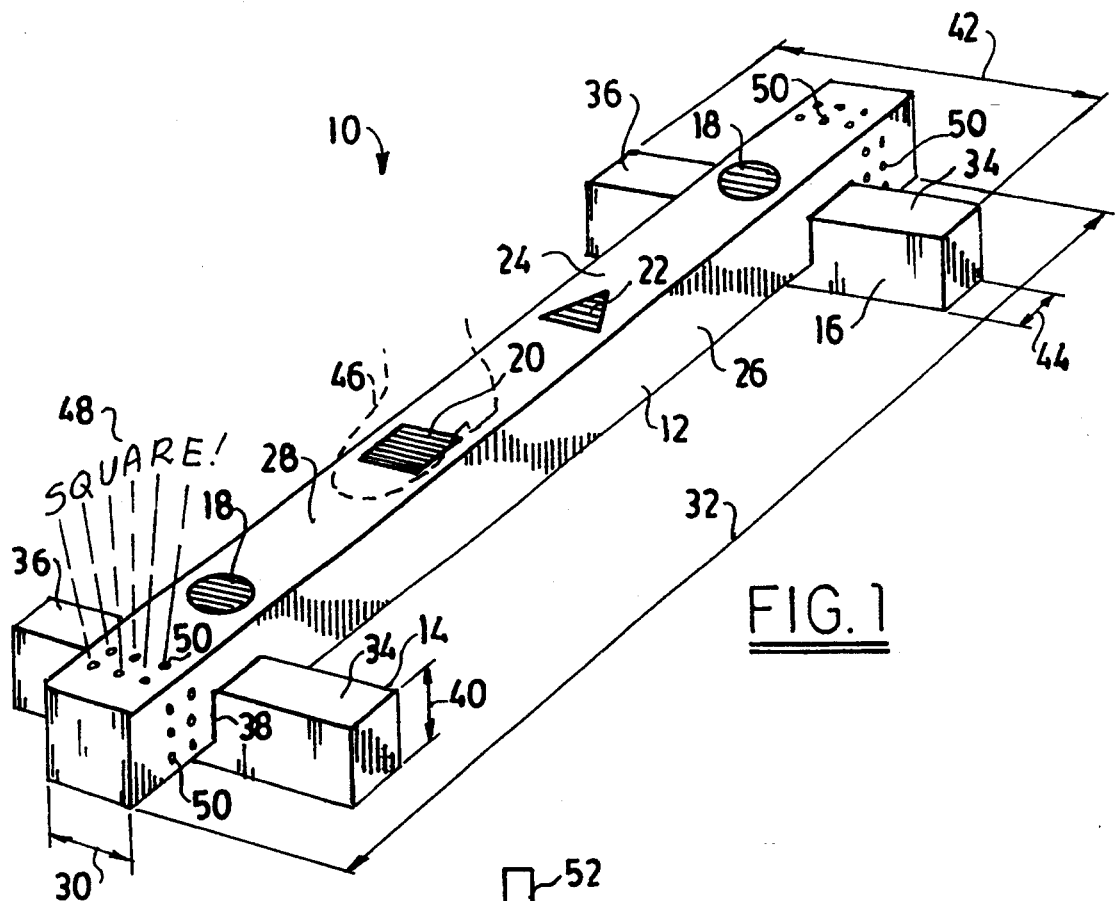
FIG. 1 is a perspective view of one preferred embodiment of the invention.

FIG. 1 is a perspective view of one preferred embodiment of applicants' educational balancing beam system 10. It will be seen that this system is preferably comprised of a beam 12, a first notched support 14, and a second notched support 16.

Referring to FIG. 1, it will be seen that beam 12 contains various symbols and/or colors on at least one of its faces. Thus, e.g., in the embodiment illustrated in FIG. 1, beam 12 contains the symbols for a circle 18, a square 20, and a triangle 22 on its top surface 24.

As will be apparent to those skilled in the art, one or more of the other surfaces of beam 12 (such as right surface 26) may contain numbers as well as shapes, letters as well as shapes, colors as well as shapes, numbers in place of shapes, letters in place of shapes, colors in place of shapes, etc. The number of possible combinations of symbols and where they appear on any one face of the beam 12 and how many of the faces of such beam contain such symbols is extremely large.

In one embodiment, not shown, beam 12 contains symbols on more than one of its sides. Thus, e.g., beam 12 might contain the alphabet on one of its sides, numbers on the second of its sides, basic shapes (such as a circle, a square, a triangle, a diamond, an oval, and the like) on a third of its sides, colors on the fourth of its sides, and the like. Many other permutations and combinations will be apparent to those skilled in the art.

Beam 12 may be used, for example, to introduce children to letters, numbers, colors, and shapes. A teacher may have children sit around the beam(s) and touch and trace various indicia with their fingers; the pressure of such touch will cause the beam to speak the name of the symbol touched. Additionally, as a child performs a selected activity on the beam(s), he may identify a color, shape, number, or letter of the alphabet along the way by stepping on it and saying it at the same time; the pressure of such stepping will cause the beam to speak the name of the symbol stepped upon.

For the sake of simplicity, the beam 12 depicted in FIG. 1 is shown having indicia on only one of its sides. However, it is preferred that such beam 12 has indicia on at least two of such sides, and preferably on at least three of such sides, and more preferably on at least four of such sides. As will be apparent to those skilled in the art, where beam 12 has symbols on more than one side, different of such sides can be placed face up within the supports 14 and 16.

The beam 12 depicted in FIG. 1 preferably has a substantially rectilinear cross-sectional shape, shaped like a square or rectangle. As will be apparent to those skilled in the art, other cross-sectional shapes may be used for such beam (such as, e.g., an equilateral triangle). It is preferred, however, that at least two of the surfaces of such beam be parallel to each other and flat. In the embodiment illustrated in FIG. 1, the beam has a cross-sectional shape in which there are two sets of surfaces each of which contains two surfaces which are parallel to each other and flat.

In one embodiment, not shown, beam 12 has a substantially triangular cross-sectional shape such as, e.g., the shape of an equilateral triangle. In this embodiment, such a triangular shaped beam may rest in one or more supports with a triangular-shaped recess to receive it.

It is preferred that beam 12 have a flat surface (such as surface 28 of beam 12) which has a width 30 which is at least about 2.5 inches and, more preferably, at least about 3 inches. In one especially preferred embodiment, the width 30 is at least about 4 inches.

Beam 12 also preferably will have a length 32 which is at least 2 feet and, preferably, will be from about 3 to about 8 feet. In one preferred, length 32 is from 3 to about 5 feet and, most preferably, about 4 feet.

By way of illustration and not limitation, beam 12 may be 4 inches wide by 4 inches square by 4 feet long.

In the embodiment depicted in FIG. 1, beam 12 contains a substantially hollow interior portion adapted to receive the electronic components necessary to make the beam speak in response to pressure. It is preferred that beam 12 consist essentially of and be constructed from plastic material by conventional plastic-forming techniques; see, e.g., Joel Frados' "Plastics Engineering Handbook," Fourth Edition (Van Nostrand Reinhold Company, New York, N.Y., 1976).

In one embodiment, beam 12 consists essentially of wood, such as pine or birch. Other possible constructions will be apparent to those skilled in the art.

Although the structure depicted in FIG. 1 illustrates the use of only one beam 12, it will be apparent that several of such beam 12's may be used in one of several different configurations. Reference may be had to applicant's copending patent application (docket M.H.D.-1) entitled "EDUCATIONAL BALANCE BEAM SYSTEM."

Referring again to FIG. 1, it will be seen that beam 12 is supported by notched supports 14 and 16. In one embodiment, not shown, beam 12 is also supported by an adjustable notched support comprised of a notched support 14 hingably attached to a notched support 16. This adjustable notched support is disclosed in applicant's copending patent application.

Referring again to FIG. 1, it will be seen that each of notched supports 14 and 16 preferably is an integral structure comprised of a first end 34, a second end 36, and a notch 38 disposed between such first end and said second end.

The notch 38 will preferably have a shape adapted to receive beam 12. Thus, when such beam has a substantially square cross-sectional shape, then notch 38 also will have a square sectional shape and dimensions slightly larger than the corresponding beam; it is preferred that the difference in the dimensions of the notch 38 and the corresponding beam 12 be less than about 0.13 inches. Thus, when such beam has a substantially triangular cross-sectional shape, then notch 38 also will have a triangular cross-sectional shape. Other configurations will be apparent to those skilled in the art.

Referring again to FIG. 1, it is preferred that notched supports 14 and 16 have a height 40 which is either equal to or less than the width 30 of the beam 12. As will be apparent to those skilled in the art, if this were not the case the completed structure (see FIG. 1, e.g.) would allow the notched supports 14 and 16 to exceed the effective height of the beam 12 and thereby interfere with the child's movement on the beam.

In one embodiment, each of notched supports 14 and 16 has a height 40 which is at least 2 inches and, preferably, is from about 2.5 to about 4 inches.

Referring again to FIG. 1, the notch 38 preferably has a depth which is at least about 90 percent of the width 30 of supports 14 and 16.

In one embodiment, not shown, notched supports similar in structure to notched supports 14 and 16 are hingeably attached to each other by means of a hinge. Any conventional hinging structure or device may be used as the hinge. The hinge may be attached while the compound support structure is being formed by, e.g., plastic forming. Alternatively, the hinge may be attached after the notched supports have been separately formed.

In the embodiment depicted in FIG. 1, each of supports 14 and 16 contains a substantially hollow interior portion; in this embodiment, it is preferred to produce such supports from plastic material by conventional plasticforming techniques; see, e.g., Joel Frados' "Plastics Engineering Handbook," Fourth Edition (Van Nostrand Reinhold Company, New York, N.Y. 1976).

In another embodiment, not shown, one or more of supports 14 and 16 have a substantially solid structure. In this embodiment, the supports may consist essentially of plastic material. Alternatively, the supports may consist essentially of wood, such as pine or birch. Other possible constructions will be apparent to those skilled in the art.

In the embodiment depicted in FIG. 1, each of the unitary notched support structures (such as notched supports 14 and 16) or the compound notched support structures which may be made therefrom by the attachment of a hinge, consists of or is comprised of a notched support building block, such as notched support 14. These notched support building blocks may all have the same shape and dimensions, or their shapes dimensions may vary.

It is preferred that notched supports 14 and 16 have a length 42 of at least 6 inches and, preferably, from about 7 to about 12 inches. In one preferred embodiment, length 42 is about 8 inches.

Referring again to FIG. 1, it is preferred that notched supports 14 and 16 have a width 44 which, preferably, will be the same or substantially the same as height 40, will be at least about 2 inches and, preferably, from about 2.5 to about 4.0 inches.

It is preferred that the notch 38 have a length which does not exceed about 50 percent of the length 42 and, preferably, does not exceed 40 percent of the length 42. In one preferred, the length of the notch 38 is from about 30 to about 40 percent of the length 42.

Notch 38 is preferably centrally disposed lengthwise along notched supports 14 and 16. Thus, e.g., where the overall length 42 is 8 inches and the length of the notch 38 is 4 inches, then the notch 38 is disposed a distance which is 2 inches from the left side of the notched support 14 or 16; and, similarly, the notch 38 is disposed a distance which is 2 inches from the right side of the notched support 14 and 16.

In one preferred embodiment, each of notched support 14 and 16 has a substantially square cross-sectional shape with a height and width which is 2.5 inches, the length of the nothced supports 14 and 16 is 8 inches, the width of the notch 38 is 2.63 inches, and the notch 38 is centrally disposed lengthwise.

In one embodiment, not shown, the bottom surface of each of notched supports 14 and 16 is comprised of non skid material which tends to maintain notched supports 14 and 16 in a fixed position on a floor while in use. Any of the non-skid materials known to those skilled in the art may be used in this embodiment. Thus, by way of illustration and not limitation, one may use friction paper, rubber pads, and the like. Thus, by way of further illustration, one may use one or more of the devices and/or compositions disclosed in U.S. Pat. Nos. 5,105,768, 5,092,348, 5,059,271, 5,058,889, 5,054,733, 5,033,146, 5,032,135, 5,026,082, 4,993,515, 4,989,926, 4,976,427, 4,972,556, 4,961,572, and the like. The disclosure of each of these patents is hereby incorporated by reference into this specification.

At least two notched supports 14 and 16 are used in applicant's system, and they may be of the same size and shape or have different sizes and shapes.

In the embodiment, not shown, in which two notched supports similar to notched supports 14 and 16 are hingably joined together, the angle formed between these notched supports may range from from zero degrees to 180 degrees. As will be apparent to those skilled in the art, when one or more hingably attached supports are used, it is advantageous to use a multiplcity of beams 12 (such as two or more such beams 12) and a multiplicity of notched supports 14 and 16. With such a system, many possible arrangements of beams 12 may be produced.

Referring again to FIG. 1, a foot 46 of a child (not shown) is shown stepping onto the symbol 20 for a square, which causes "SQUARE" sound 48 to be emitted from one or more of the speaker grills 50 disposed on the surface of the beam 12.

Any of the conventional means of causing a device to "talk" in response to a stimulus (such as the pressure of a child's foot or hand or other body part) may be used in applicant's device. Thus, by way of illustration and not limitation, one may use one or more of the sensors and/or electronic circuits and/or other hardware and/or software disclosed in U.S. Pat. Nos. 5,097,856 (electronic talking stick for the blind), 4,990,092 (talking book), 4,970,659 (learning aid with MOS speech synthesizer chip), 4,946,391 (electronic arithmetic learning aid with synthetic speech), 4,937,796 (vehicle backing aid), 4,923,428 (interactive talking toy), 4,890,007 (talking clock activated by pressure), 4,884,974 (interactive talking book), 4,843,497 (talking animated doll), 4,840,602 (talking doll), 4,835,520 (talking alarm for openable compartment), 4,805,328 (talking doll), 4,775,352 (talking doll), 4,765,623 (talking crystal ball), 4,690,655 (talking marionette), 4,636,881 (talking book), 4,621,348 (talking depth sounder), 4,573,460 (talking tracheostomy tube), 4,573,134 (talking calculator), 4,489,405 (talking depth sounder), 4,484,408 (talking figure play set), 4,395,135 (talking time piece), 4,381,558 (talking greeting card), 4,380,185 (talking metronome), 4,375,329 (talking copier), 4,291,342 (talking mailbox), 3,938,120 (talking door sentinel), 3,873,982 (talking direction finder), 3,862,761 (talking tape measure), 3,835,640 (talking alarm clock), 3,741,565 (talking photograph album), 3,554,556 (talking learning puzzle), 3,546,668 (talking speedometer), D311,348 (talking fire alarm), D304,342 (talking calendar), and the like. The entire disclosure of each of these United States patents is hereby incorporated by reference into this specification.

As will be apparent to those skilled in the art, the circuitry used to produce the speech required for such talking devices is very well known. Thus, by way of further illustration, one may utilize one or more of the electronic circuits disclosed, e.g., in Rudolf F. Graf's "The Encyclopedia of Electronic Circuits" (Tab Books Inc., Blue Ridge Summit, Pa., 1985).

Figure 2:
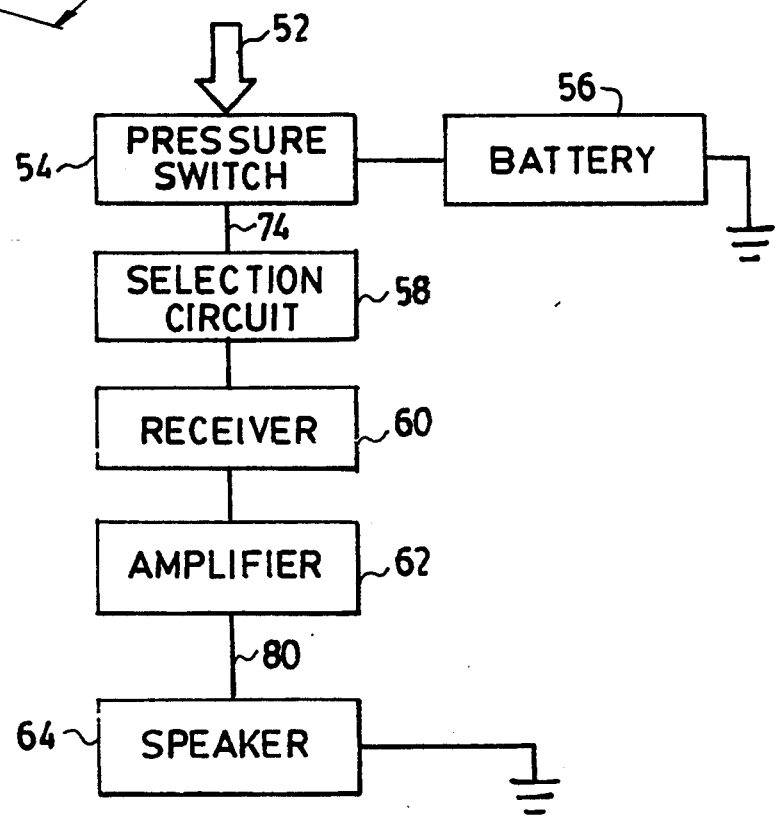
FIG. 2 is block diagram illustrating how the device of FIG. 1 is caused to speak the name of a symbol when pressure is applied to such device.

Referring to FIG. 2, reference may be had to one preferred means for causing beam 12 to talk with pressure is applied to one of its surfaces in the direction of arrow 52. Such pressure will activate pressure switch 54, which will then allow current to flow from battery 56 to selection circuit 58 and receiver 60. The output thus chosen and produced may be amplified in amplifier 62 and expressed as talk in speaker 64.

Figure 3:
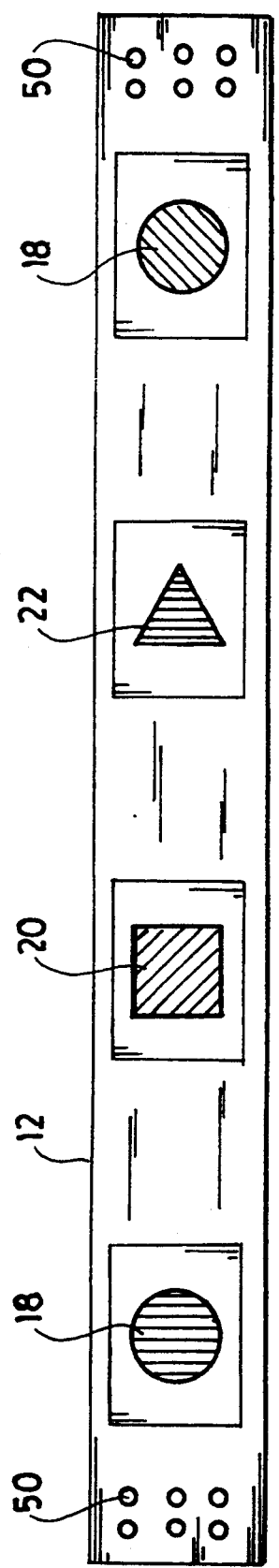
FIG. 3 is a top view of the beam used in the device of FIG. 1.
Figure 4:
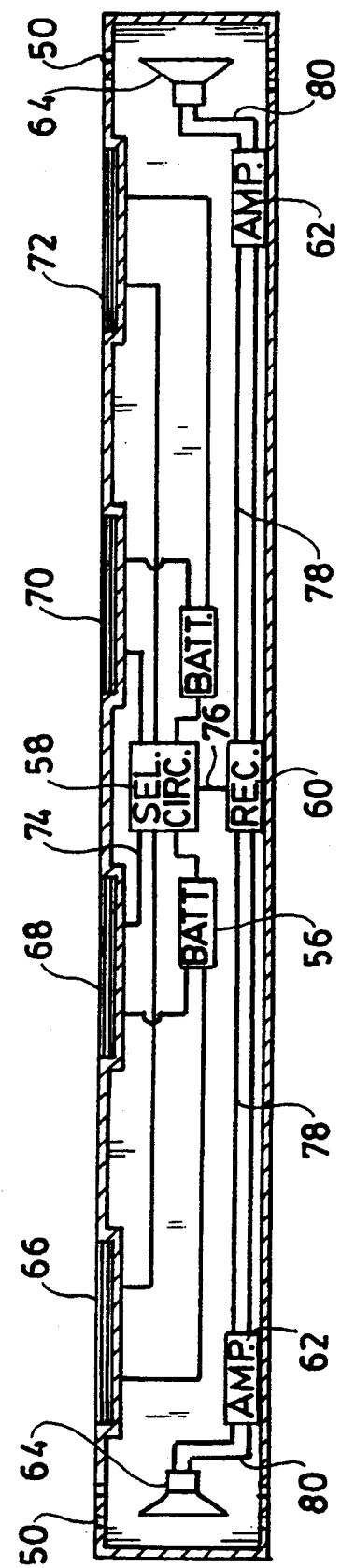
FIG. 4 is a schematic view of the interior of the beam used in the device of FIG. 1.

FIG. 3 is a top view of beam 12 showing symbols 18, 20, 22, and 18. FIG. 4 is a side view of beam 12 showing, from left to right, pressure transducers 66, 68, 70, and 72 disposed under the symbols 18, 20, 22, and 18, respectively.

Reference now will be made to what occurs when the pressure sensor 20 is activated, it being understood that a similar chain of events occurs for the activation of the other pressure sensors.

When a foot 46 activates pressure sensor 20 (see FIG. 1), current is allowed to flow from battery 56, through the pressure sensor switch 68, through line 74, to selection circuit 58. The selection circuit 58 then produces an output compatible with the fact that the square 20 was stepped on or otherwise touched; and this output is fed via line 76 to receiver 60 and thence by lines 78 to amplifier 62. The amplified output from amplifers 62 is then fed via lines 80 to speakers 64. The sound thus produced may exit via speaker holes 50.

Those skilled in the art will recognize that this arrangement is merely one of many which can be utilized to transduce the pressure created when one of symbols 18, 20, or 22 is touched into talking.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. An educational talking balance beam comprised of a beam, a first notched support base, and a second notched support base, wherein;
   (a) said beam is comprised of a first wall, a second wall, and a third wall, and a hollow interior portion extending through substantially the entire length of said beam, wherein:
      1. said first wall has a first exterior surface, said second wall has a second exterior surface, and said third wall has a third exterior surface, and
      2. a multiplicity of symbols selected from the group consisting of numbers, letters, shapes, colors, and mixtures thereof appear on said first exterior surface of said first wall, a multiplicity of symbols selected from the group consisting of numbers, letters, shapes, colors, and mixtures thereof appear on said second exterior surface of said second wall, and a multiplicity of symbols selected from the group consisting of numbers, letters, shapes, colors, and mixtures thereof appear on said third exterior surface of said third wall,
   (b) each of said first notched support base and said second notched support base is an integral structure comprised of a first end, a second end, and a notch disposed between said first end and said second end, and
   (c) said educational talking balance beam is comprised of a means for announcing the name of a said symbol selected from the group consisting of numbers, letters, shapes, colors, and mixtures thereof, said means for announcing comprising a pressure sensor for sensing a user walking on said indicia, said pressure sensor activating an electronic circuit which sends an output signal, representing said indicia, to a speaker, whenever pressure is applied to at least one of said first exterior surface of said beam, said second exterior surface of said beam, and said third exterior surface of said beam at a point where said symbol appears on said exterior surface of said beam, and wherein said means for announcing the name of said symbol is disposed within said hollow interior of said beam, wherein the beam is rotatable relative to the first and second support base, so indicia from any side can be facing upward, providing another walking surface with said means for announcing the name of said symbols located therein.

2. The educational talking balance beam as recited in claim 1, wherein said beam has a substantially square cross-sectional shape.

3. The educational talking balance beam as recited in claim 2, wherein said notch has a substantially rectilinear shape.

4. The educational talking balance beam as recited in claim 3, wherein each of said first notched support base and said second notched support base has substantially the same size and shape.

5. The educational talking balance balance beam as recited in claim 4, wherein said beam has a width of at least about 2.5 inches.

6. The educational talking balance beam as recited in claim 5, wherein said beam has a height of at least about 2.5 inches.

7. The educational talking balance beam as recited in claim 6, wherein said beam has a length of at least 2 feet.

8. The educational talking balance beam as recited in claim 7, wherein said beam has a length of from about 3 to about 5 feet.

9. The educational talking balance beam as recited in claim 8, wherein said beam is an integral, hollow structure.

10. The educational talking balance beam as recited in claim 9, wherein said beam beam consists essentially of plastic.

11. The educational talking balance beam as recited in claim 10, wherein each of said first notched support base and said second notched support base has a notch with a depth which is at least 90 percent of the height of said notched support base.

* * * * *